United States Patent
Ang et al.

(10) Patent No.: US 11,936,562 B2
(45) Date of Patent: Mar. 19, 2024

(54) VIRTUAL MACHINE PACKET PROCESSING OFFLOAD

(71) Applicant: VMware LLC, Palo Alto, CA (US)

(72) Inventors: Boon Seong Ang, Saratoga, CA (US); Yong Wang, San Jose, CA (US); Guolin Yang, San Jose, CA (US); Craige Wenyi Jiang, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/039,946

(22) Filed: Jul. 19, 2018

(65) Prior Publication Data

US 2020/0028785 A1 Jan. 23, 2020

(51) Int. Cl.
*H04L 47/125* (2022.01)
*G06F 9/455* (2018.01)
(Continued)

(52) U.S. Cl.
CPC ........ *H04L 47/125* (2013.01); *G06F 9/45558* (2013.01); *H04L 45/64* (2013.01); *H04L 61/256* (2013.01); *G06F 2009/45595* (2013.01)

(58) Field of Classification Search
CPC ..... H04L 47/125; H04L 45/64; H04L 45/586; H04L 49/70; H04L 47/12; H04L 49/30; H04L 61/256; G06F 2009/45562; G06F 2009/4557; G06F 9/45558; G06F 9/455; G06F 9/44; G06F 12/00; G06F 13/00;
(Continued)

(56) References Cited

U.S. PATENT DOCUMENTS 10,129,106 B2 * 11/2018 Cropper ............... H04L 41/5054
10,516,649 B1 * 12/2019 Jain ........................ H04L 63/168
(Continued)

FOREIGN PATENT DOCUMENTS

WO  WO2019089131 A1 *  5/2019  ............. G06F 9/445

OTHER PUBLICATIONS

Bite the bytes, "Fast path and Slow path" dated Oct. 22, 2013 (2 pages).
(Continued)

*Primary Examiner* — Sudesh M Patidar
(74) *Attorney, Agent, or Firm* — King Intellectual Asset Management (57) ABSTRACT

A method to offload network function packet processing from a virtual machine onto an offload destination is disclosed. In an embodiment, a method comprises: defining an application programing interface ("API") for capturing, in a packet processor offload, a network function packet processing for a data flow by specifying how to perform the network function packet processing on data packets that belong to the data flow. Based on capabilities of the packet processor offload and available resources, a packet processing offload destination is selected. Based at least on the API, the packet processor offload for the packet processing offload destination is generated. The packet processor offload is downloaded to the packet processing offload destination to configure the packet processing offload destination to provide the network function packet processing on the data packets that belong to the data flow. The packet processing offload destination is a PNIC or a hypervisor.

16 Claims, 8 Drawing Sheets

(51) Int. Cl.
*H04L 45/64* (2022.01)
*H04L 61/256* (2022.01)

(58) Field of Classification Search
CPC .. G06F 9/00; G06F 2009/45595; G06F 9/545;
G06F 9/45533
USPC .......................................................... 370/229
See application file for complete search history.

(56) References Cited

U.S. PATENT DOCUMENTS

| | | | | |
|---|---|---|---|---|
| 10,999,219 | B1* | 5/2021 | Athreyapurapu | ... H04L 41/5051 |
| 2002/0062333 | A1* | 5/2002 | Anand | ................... G06F 9/5027 |
| | | | | 718/105 |
| 2002/0095519 | A1* | 7/2002 | Philbrick | ................. H04L 67/62 |
| | | | | 709/250 |
| 2006/0168436 | A1* | 7/2006 | Campbell | ............. G06Q 10/06 |
| | | | | 713/1 |
| 2010/0274890 | A1* | 10/2010 | Patel | ....................... H04L 43/08 |
| | | | | 709/224 |
| 2012/0084487 | A1* | 4/2012 | Barde | ................. G06F 9/45541 |
| | | | | 711/6 |
| 2012/0324442 | A1* | 12/2012 | Barde | ..................... H04L 49/70 |
| | | | | 718/1 |
| 2013/0058208 | A1* | 3/2013 | Pfaff | ...................... H04L 47/783 |
| | | | | 370/217 |
| 2013/0061047 | A1* | 3/2013 | Sridharan | ........... H04L 12/4666 |
| | | | | 713/162 |
| 2013/0125125 | A1* | 5/2013 | Karino | ................. G06F 9/5044 |
| | | | | 718/1 |
| 2013/0343399 | A1* | 12/2013 | Kandula | ............ H04L 41/0893 |
| | | | | 370/412 |
| 2014/0280949 | A1* | 9/2014 | Anantharam | ......... G06F 9/5088 |
| | | | | 709/226 |
| 2015/0067674 | A1* | 3/2015 | Melander | ................ H04L 49/70 |
| | | | | 718/1 |
| 2015/0139232 | A1* | 5/2015 | Yalagandula | ......... H04L 63/162 |
| | | | | 370/392 |
| 2015/0160961 | A1* | 6/2015 | Johnson | ............. H04L 65/4084 |
| | | | | 718/1 |
| 2015/0281098 | A1* | 10/2015 | Pettit | .................. H04L 47/2441 |
| | | | | 370/235 |
| 2016/0182408 | A1* | 6/2016 | Jani | ........................ H04L 12/56 |
| | | | | 370/474 |
| 2016/0232019 | A1* | 8/2016 | Shah | .................... G06F 9/45558 |
| 2017/0295033 | A1 | 10/2017 | Cherian et al. | |
| 2017/0366605 | A1* | 12/2017 | Chang | ................. H04L 67/1008 |
| 2018/0109471 | A1* | 4/2018 | Chang | .................... H04L 49/70 |
| 2018/0157515 | A1* | 6/2018 | Malloy | ................. H04L 47/627 |
| 2018/0357098 | A1* | 12/2018 | Dube | .................... G06F 9/5005 |

OTHER PUBLICATIONS

Ciena, entitled "Blue Planet NFV Orchestration" dated May 22, 2018 (7 pages).
Blue Planet streamlines the definition and creation of NFV-based services (1 pg).
VMware vSphere, entitled Single Root I/O Virtualization (SR-IOV) dated Feb. 26, 2018 (3 pages).
Pat Bossharat et al., entitled "P4: Programming Protocol-Independent Packet Processors" dated Jul. 2014 (8 pages).
Microsoft Docs, entitled "SR-IOV Virtual Functions (VFs)" dated Apr. 20, 2017 (1 page).

* cited by examiner

VIRTUAL MACHINE PACKET PROCESSING OFFLOAD

BACKGROUND

In virtualization environments, virtual machines may be configured to perform network function packet processing. The network function processing may include packet encapsulation, decapsulation, forwarding, and the like. However, even though some network function processing has been implemented in virtual machines, the current implementations struggle to deliver high packet processing rates.

Achieving high packet processing rates is challenging. For example, even with state-of-the-art network stacks implemented in a hypervisor of a host computer, a single Xeon 2+GHz processor core can only deliver and transmit a fraction of the maximum packet rate of a 10 Gbps Ethernet link. Even if one assumes a linear scaling with a larger number of processor cores capable of handling the bi-directional 10 Gbps Ethernet link, one would need many Xeon cores to support 10 Gbps line rate at a minimum packet size.

These days, not only are the fast Ethernet links available, but also fast network interface controllers operating at 40, 50, and even 100 Gbps rates are offered. Therefore, it is highly desirable to implement the network function processing capable of delivering very high packet processing rates.

SUMMARY

Techniques are described herein for offloading network function packet processing from a virtual machine via a virtual device, such as a virtual network interface controller ("VNIC"), to accelerate the packet processing. Examples of offload destination of the offloaded network processing may include a hypervisor and a physical network interface controller ("PNIC"). A virtual machine is referred to herein as a "VM." The offloading may be implemented by emulating the packet processing in a component of the hypervisor or in hardware of the PNIC. The offloading of the packet processing onto the virtual device allows performing the packet processing at a high rate, especially if the packet processing is offloaded from a VM onto the PNIC's hardware.

In an embodiment, a method for offloading network function processing includes generating a packet processing offload, and downloading the offload to a PNIC hardware, or to a packet processing module of a hypervisor, which may use hardware acceleration features available on the physical platform apart from what the physical NIC provides. The offload itself and the offload's destination are usually determined based on availability of PNICs, capacities of the available PNICs, hardware capabilities of the PNIC and capabilities of the hypervisor.

One of the benefits of offloading the network function processing from a VM to a PNIC or other platform hardware is that the hardware can often perform the network functions on data packets much faster than the VM. Even in the absence of hardware acceleration, offloading the network function processing from a VM avoids transmitting the packets to and from the VM via a VNIC. This may be particularly relevant in for example, the packet forwarding that involves packets' encapsulation and decapsulation for overlay networks, IP routing, or network address translation ("NAT") processing. Since the cost, in terms of processor cycles, of delivering data packets to a VM via the VNIC and transmitting the processed packets from the VM via the VNIC is relatively high, the offloading of the entire network function processing of data packets from the VM to the hypervisor may provide considerable time and cost savings.

DETAILED DESCRIPTION

In the following description, for the purposes of explanation, numerous specific details are set forth in order to provide a thorough understanding of the method described herein. It will be apparent, however, that the present approach may be practiced without these specific details. In some instances, well-known structures and devices are shown in a block diagram form to avoid unnecessarily obscuring the present approach.

1. Example Physical Implementations

Figure 1:
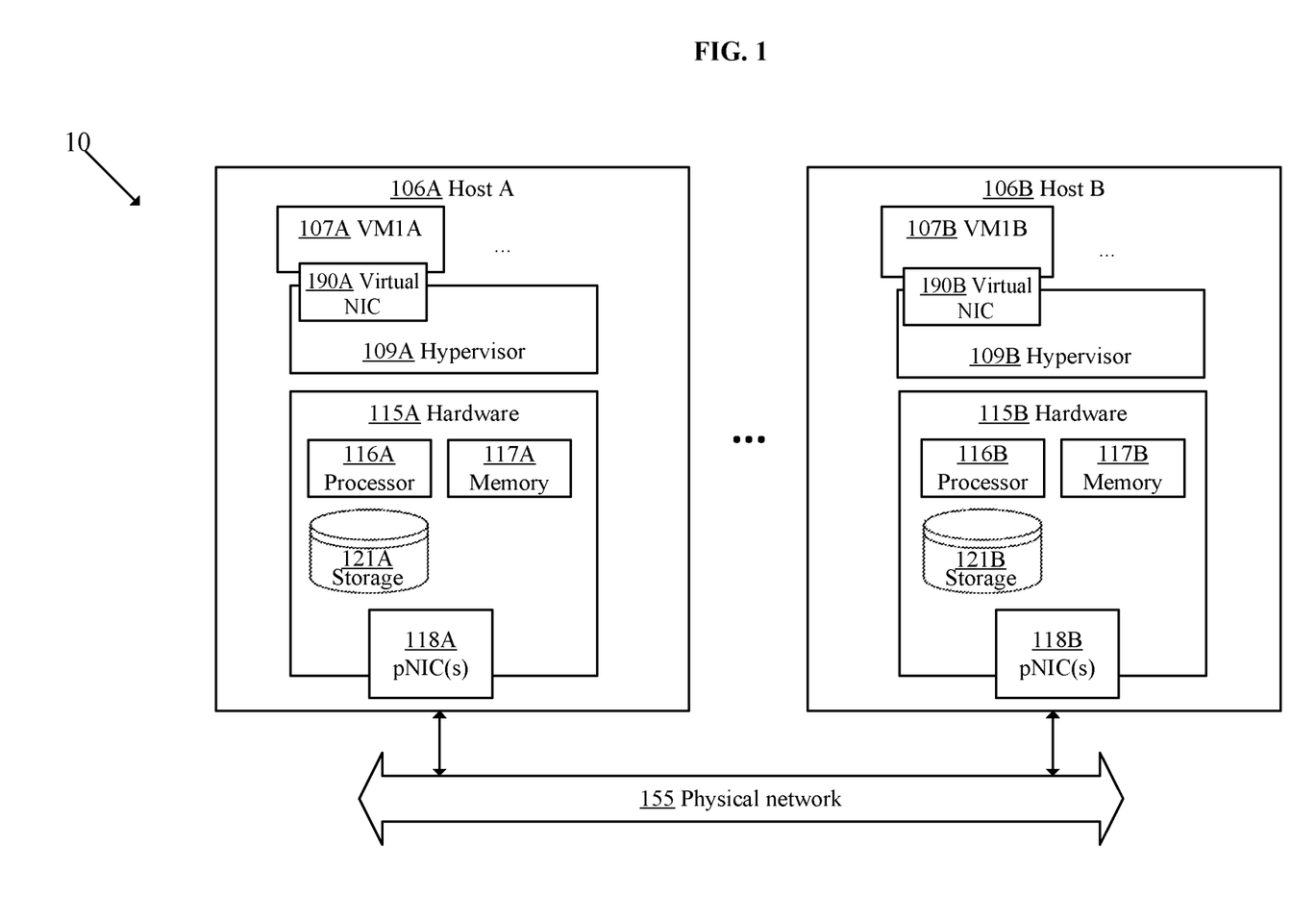
FIG. 1 is a block diagram depicting an example physical implementation view of an example logical network environment for implementing a virtual machine packet processing offload via a virtual device.

FIG. 1 is a block diagram depicting an example physical implementation view of an example logical network environment 10 for implementing a virtual machine packet processing offload via a virtual device. In the depicted example, environment 10 includes one or more hosts 106A and 106B, and one or more physical networks 155.

Hosts 106A and 106B may be used to implement logical routers, logical switches and VMs executing in environment 10. Hosts 106A and 106B are also referred to as computing devices, host computers, host devices, physical servers, server systems, or physical machines. Each host may be configured to support several VMs. In the example depicted in FIG. 1, host 106A is configured to support a VM1A 107A, while host 106B is configured to support a VM1B 107B. Additional VMs (not shown) may also be supported by hosts 106A-106B.

Virtual machines VM1A-VM1B executed on hosts 106A-106B, respectively, are examples of virtualized computing instances or workloads. A virtualized computing instance may represent an addressable data compute node or an isolated user space instance. VM1A-VM1B may be configured to provide network function packet processing, including packet forwarding, encapsulation and decapsulation for overlay networks, IP routing, NAT processing, security monitoring or enforcement, and the like.

Hosts 106A and 106B may be configured to support execution of hypervisors 109A and 109B, respectively.

Hypervisors 109A and 109B are software layers or components that support the execution of multiple VMs, such as VM1A-VM1B. Hypervisors 109A and 109B may be configured to implement virtual switches and forwarding tables (not shown) that facilitate data traffic between VM1A-VM1B. Hypervisors 109A and 109B may also maintain mappings between resources of the underlying hardware 115A and 115B allocated to the VMs, respectively, and virtual resources of the VMs.

Hosts 106A and 106B may be configured with VNICs 190A and 190B, respectively. A VNIC may be used by a VM as its network interface. A VNIC is assigned a MAC address, and a VM may use a VNIC to communicate with other VMs, hypervisors, or other network end-points reachable from the physical network that the VNIC is connected to. In the depicted example, VM1A 107A may use VNIC 190A to communicate with VM1B 107B and hypervisor 109A or hypervisor 109B, while VM1B 107B may use VNIC 190B to communicate with VM1A 107A and hypervisor 109B or hypervisor 109A.

Hardware component 115A may include one or more processors 116A, one or more memory units 117A, one or more PNICs 118A, and one or more storage devices 121A. PNIC 118A may provide connectivity between host 106A and routers and switches of physical network 155.

Hardware component 115B may include one or more processors 116B, one or more memory units 117B, one or more PNICs 118B, and one or more storage devices 121B. PNIC 118B may provide connectivity between host 106B and routers and switches of physical network 155.

2. Example Slow and Fast Path Processing

In an embodiment, an approach includes offloading the fast path processing from a VM onto an offload destination, and allowing the less frequent slow path processing to be still performed by the VM. Usually, the fast path processing of packets of a data flow may be performed once the slow path processing has been completed for initial packet(s) of the data flow. A data flow is a set of packets having common characteristics such that they are similarly classified and processed. In a common example, a dataflow may comprise packets having a particular 5-tuple comprising a source and destination IP address, source and destination layer 4 port number, and a protocol identifier. However, in the present context, the term, "dataflow" should be understood to be any set of packets having at least one common characteristic Slow path processing may include receiving a data packet by a VM, determining the packet's characteristics for the packet, and, based on the packet characteristics and for example rules, identifying primitives and instructions to be performed on the packet and subsequently received packets that belong to that data flow. This may be performed by accessing the tables that capture the correspondence between the rules and the packet characteristics. The primitives may capture software components that collectively form the desired packet processing functionalities. The instructions may represent the network function processing functionalities to be performed on the primitives.

Fast path processing may include receiving a data packet, determining the packet's characteristics, matching the packet's characteristics against the characteristics for which primitives and instructions have been already defined and configured, and if a match is found, executing, on the packet, the instructions that are associated with the flow. If the match is not found, then the packet is rerouted to a slow path.

Figure 2:
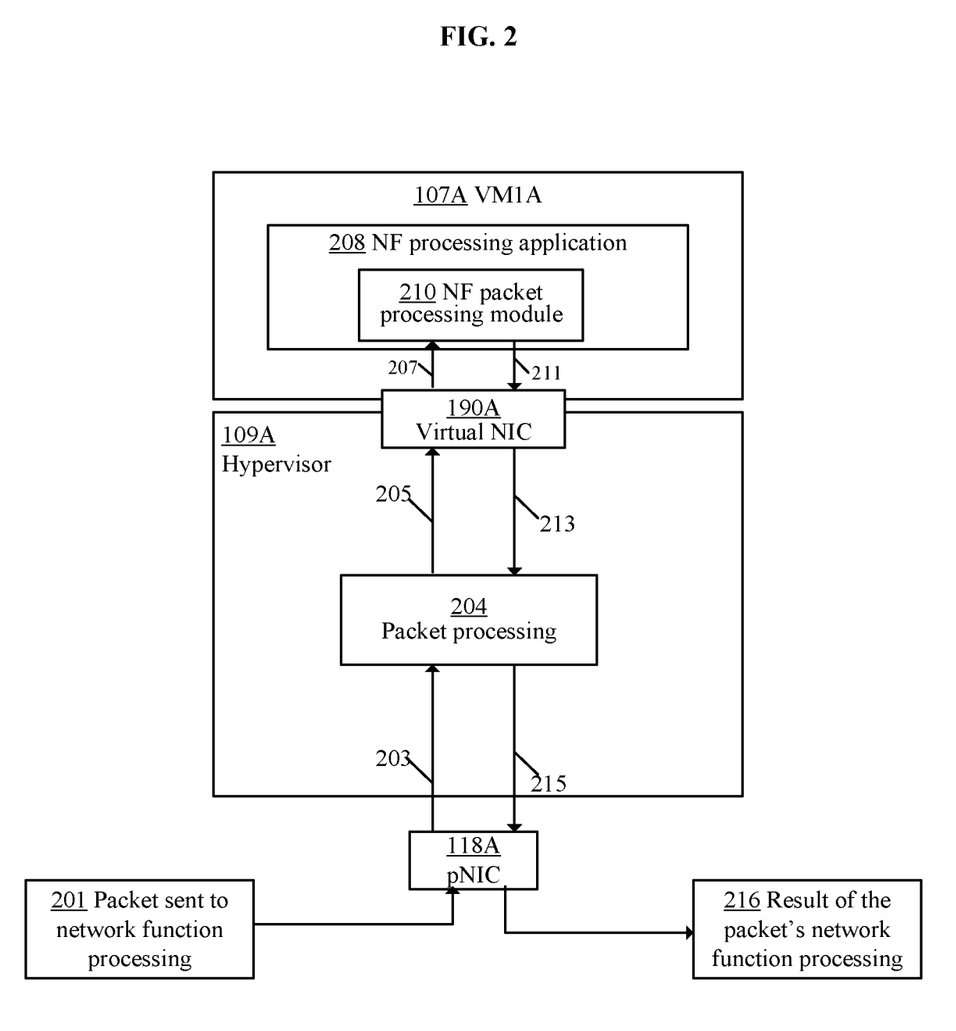
FIG. 2 is a block diagram depicting an example slow path processing for network function packet processing without an offload.

FIG. 2 is a block diagram depicting an example slow path processing for network function packet processing without an offload. In the depicted example, the slow path processing is performed by VM1A 107A, described in detail in FIG. 1.

Slow path processing may include receiving, by PNIC 118A, a data packet 201 that requires network function packet processing. PNIC 118A may deliver (203) packet 201 to a packet processing 204. Packet processing 204, which may be implemented in hypervisor 109A, may inspect packet 201, determine a data flow for packet 201, and determine whether the data flow has been configured. The data flow may be determined by, for example, hashing header fields, such as a 5-tuple, to obtain an identifier that is substantially unique to each data flow. If the data flow has not been configured, then packet processing 204 may deliver (205) packet 201 to a VNIC 190A, which may deliver (207) packet 201 to a network function processing application 208 executing in VM1A 107A.

Network function processing application 208 may be executed to configure the network function processing for the data flow. This may include defining primitives and instructions for performing the network function processing on packets of the data flow, and storing the primitives and instructions in a network function packet processing module 210.

In an embodiment, network function processing application 208 executes network function processing module 210 to process packet 201, and provides (211) the processed packet to VNIC 190A. VNIC 190A may provide (213) the processed packet to packet processing 204. Packet processing 204 may provide (215) the processed packet to PNIC 118A, which may output a resulting processed packet 216, which is then transmitted toward the packet's destination.

However, if packet processing 204 determines that the data flow for packet 201 has been already configured and network function packet processing module 210 for the data flow has been already generated and stored, then network function packet processing module 210 may be executed to process packet 201. The processed packet may then be delivered (211) to VNIC 190A, which may deliver (213) the processed packet to packet processing 204. Packet processing 204 may deliver (215) the processed packet to PNIC 118A, to be transmitted, as packet 216, toward the packet's destination.

3. Offloading Network Function Processing

In an embodiment, an approach includes offloading network function processing that otherwise would have been performed by a VM. An example of the network processing function is a network processing function that operates on any network layer between the lower layers of networking and the Layer 4 of networking. The packet processing up to the Layer 4 (i.e., up to and through the TCP/IP processing) usually involves matching certain fields of a header of the packet to a set of configured data flows, and when a match is found, performing the instructions defined for the matching flow.

In an embodiment, an approach includes offloading both stateless and stateful packet processing. In the stateless processing, a match-action process does not depend on a dynamic state associated with a data flow. Some states, however, may be tracked. For example, one may track packet and byte hit counts. However, this type of state tracking does not influence the type of the network function processing performed on data packets.

In the stateful processing, when the processing is performed by for example, a stateful firewall, connection states (e.g., TCP states) of data flows can be tracked, and the tracking may influence the manner in which the packets are processed. Therefore, when the processing is offloaded from a VM onto for example, a hypervisor, the hypervisor may need to track the connection states. This may include tracking the ranges of the current TCP window sequence numbers and dropping packets that have sequence numbers outside a permitted range.

In an embodiment, a determination is made whether the network function packet processing can be offloaded based on a variety of factors. Some of the factors may include business considerations, such as a time-to-market for implementing a solution, or availability of a PNIC supplier. If a PNIC supplier is available, then the decision to offload the processing onto a PNIC may be made early in a design. On the other hand, if a decision is made to implement a hypervisor-based software offload, then it needs to be determined whether to implement it in kernel space or user space.

In an embodiment, determining whether the network function packet processing can be offloaded to a PNIC or a component of a hypervisor usually depends on hardware capabilities of the PNIC and capabilities of the hypervisor. Offloading the packet processing onto the PNIC may be more beneficial than offloading onto the hypervisor because it may result in achieving higher packet processing rates than if the processing was offloaded onto the hypervisor.

However, in some situations, due to hardware limitations of a PNIC, offloading the network function packet processing onto the PNIC may not be feasible. In such situations, the packet processing may be offloaded onto the hypervisor because it is still beneficial to offload the packet processing from the VM to save some processing and computation resources of the VM.

3.1. Offloading Network Functions to a Physical Network Interface Controller

Figure 3:
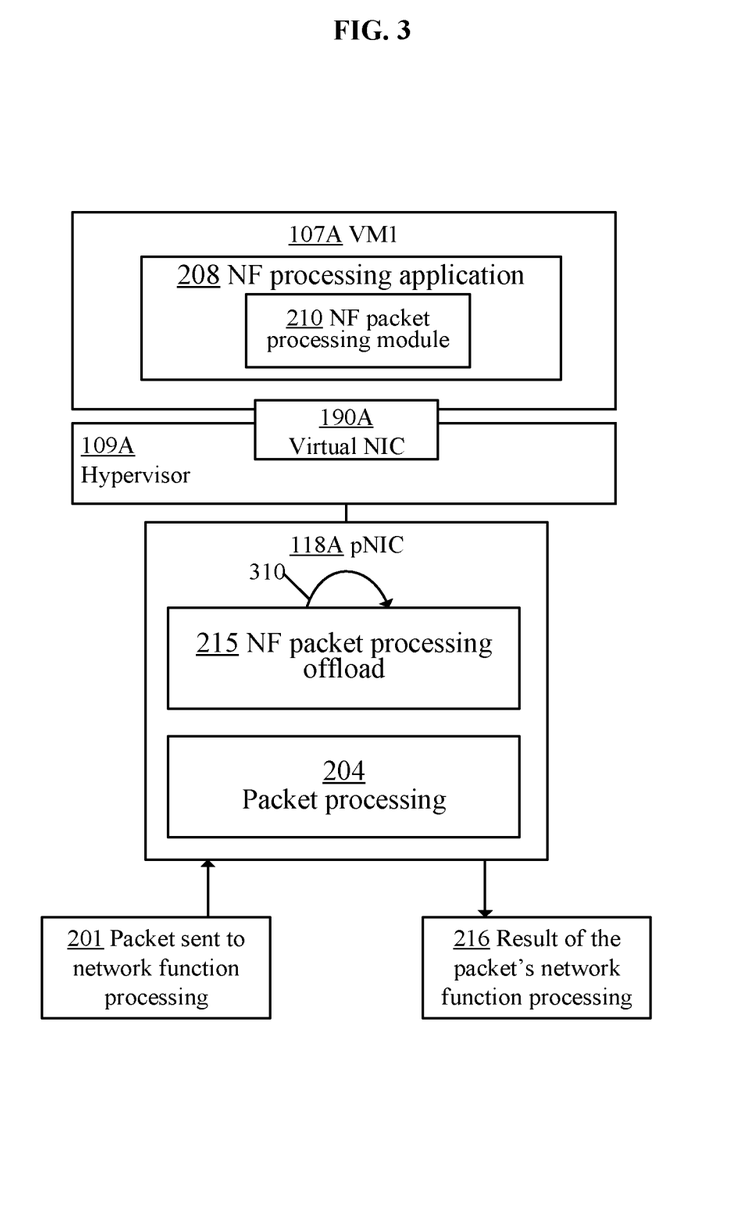
FIG. 3 is a block diagram depicting an example of offloading network function processing to a physical network interface card.

FIG. 3 is a block diagram depicting an example of offloading network function processing to a PNIC 118A. In the depicted example, VM1 107A generates, while performing a slow path processing for a data flow, network function packet processing module 210. Hypervisor 109A offloads network function packet processing module 210 onto PNIC 118A, and saves it as an offloaded network function packet processing module 215 on PNIC 118A.

Offloaded network function packet processing module 215, also referred to herein as an offload 215, is used to leverage the network function packet processing against hardware capabilities of a physical device, such as PNIC 118A. Offload module 215 captures the packet processing configurations generated by VM1 107A, and is further programmed into PNIC 118A to allow PNIC 118A to apply the network function packet processing to data packets passing through PNIC 118A.

Generating and programming offload module 215 includes translating contents of network function packet processing module 210 to primitives and instructions that PNIC 118A can perform on data packets. This may include interfacing network function packet processing module 210 to the processing specification of PNIC 118A because most likely, the processing specification of network function processing module 210 does not match the processing specification of PNIC 118A. The generating and programming of offload module 215 may be performed by hypervisor 109A to ensure that offload module 215 is compatible with the processing specification of PNIC 118A.

Once offload module 215 is downloaded onto PNIC 118A, PNIC 118A may start using offload module 215 to process data packets received by PNIC 118A. For example, upon receiving packet 201, a packet processing 204 may determine a data flow for packet 201, and whether offload 215 is configured to process the data flow. If packet processing 204 determines that offload 215 is configured on PNIC 118A to process the data flow, then PNIC 118A may use offload 215 to process packet 201 along a path 310. Otherwise, a slow path processing is performed on packet 201.

Offloading network function packet processing from VM1 107A to PNIC 118A provides many benefits. For example, offloading the processing onto PNIC 118A allows performing the network function packet processing entirely, or at least partially, in hardware of PNIC 118A, and thus allows achieving a high packet processing rate. The specialized hardware included in PNIC 118A may enhance the packet processing at a reduced CPU cost.

3.2. Offloading Network Functions to a Hypervisor

Figure 4A:
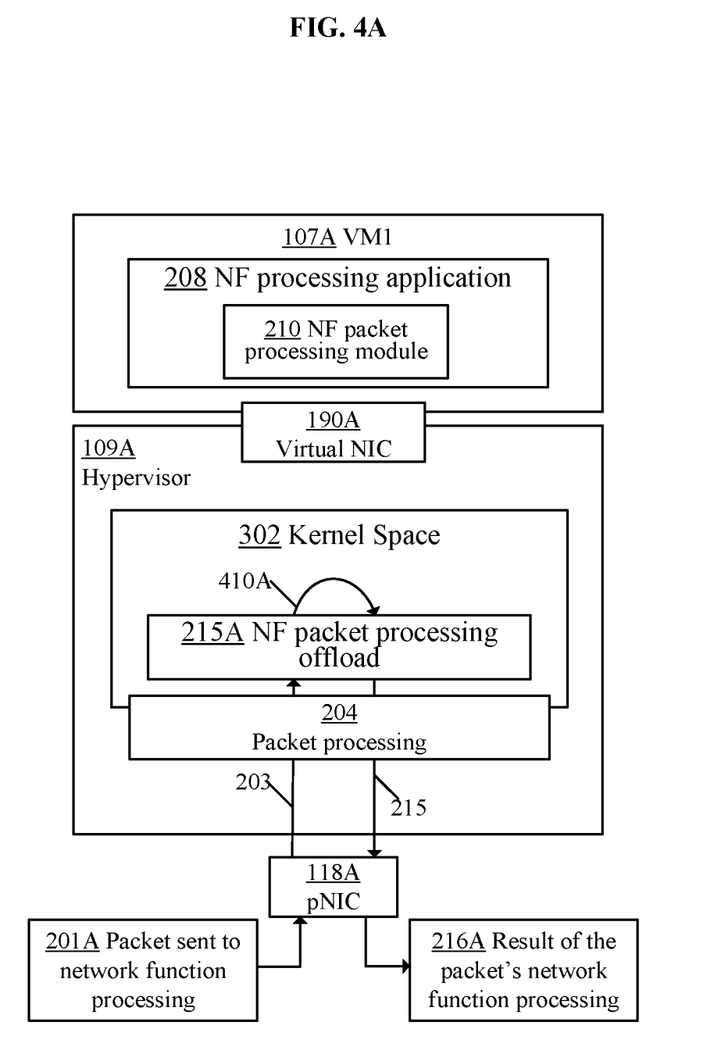
FIG. 4A is a block diagram depicting an example of offloading network function processing to kernel space of a hypervisor.
Figure 4B:
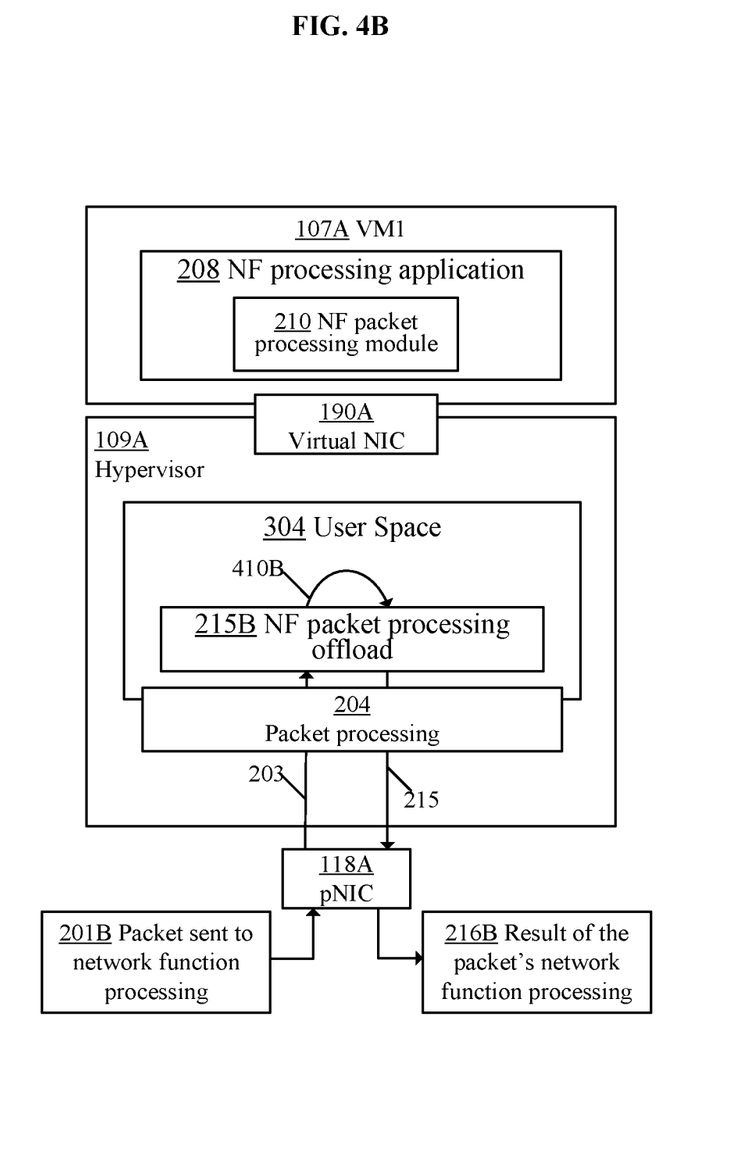
FIG. 4B is a block diagram depicting an example of offloading network function processing to user space of a hypervisor.

In an embodiment, network function packet processing is offloaded from VM1 107A to either a kernel space 302 of hypervisor 109A or user space 304 of hypervisor 109A. Determining whether to offload the network function packet processing to kernel space 302 or to user space 304 may be based on determining the hypervisor's own configuration, the offload itself, the space requirements of the network function packet processing offload, and the space capacities of kernel space 302 and user space 304.

FIG. 4A is a block diagram depicting an example of offloading network function processing to kernel space 302 of hypervisor 109A. In the depicted example, VM1 107A generates, while performing a slow path processing for a data flow, network function packet processing module 210, and hypervisor 109A offloads network function packet processing module 210 onto kernel space 302, and saves it as an offloaded network function packet processing module 215A, also called an offload 215A, in kernel space 302. Offload 215A is downloaded to kernel space 302 to facilitate network function packet processing of a packet 201A along a path 410A, and to produce a resulting, processed packet 216A.

FIG. 4B is a block diagram depicting an example of offloading network function processing to user space 304 of hypervisor 109A. In the depicted example, VM1 107A generates, while performing a slow path processing for a data flow, network function packet processing module 210. Hypervisor 109A offloads network function packet processing module 210 onto user space 304, and saves it as an offloaded network function packet processing module 215B, or an offload 215B, in user space 304. Offload 215B is downloaded to user space 304 to facilitate network function packet processing of a packet 201B along a path 410B, and to produce a resulting, processed packet 216B.

Even though offloading the network function processing from VM1 107A to a component of a hypervisor may amount to offloading the processing from one software component (i.e., VM1 107A) to another software component, the offloading provides many benefits. When the entire processing of a packet forwarding operation is offloaded from VM1 107A to a component of the hypervisor, the offloading may result in significant CPU savings because data packets do not need to be communicated via VNIC 190A. This may be illustrated by comparing a typical network function processing performed on a data packet by a virtual machine with a network function processing performed by a processing module offloaded to a hypervisor. In a typical network function processing, VM1 107A receives a data packet, transforms the packet, and then transmits the packet toward the packet's destination. The packet, therefore, is forwarded by hypervisor 109A via VNIC 190A to VM1 107A, and VM1 107A transforms the packet and sends the transformed packet via VNIC 190A to hypervisor 109A. The cost of delivering packets to VM1 107A and transmitting the transformed packet out of VM1 107A can be quite substantial, and can negatively impact the packet processing rate. For example, in one implementation, a server CPU core running at 100% delivering and transmitting packets between PNIC 118A and VNIC 190A spends about 60% of its CPU cycles on the VNIC emulation portion.

Furthermore, to deliver a packet to VM1 107A, hypervisor 109A copies the packet data from hypervisor memory into VM1 ' memory, and invokes a guest VNIC driver to handle and deliver the packet to VM1 107A. Once VM1 107A transforms the packet, the transformed packet is copied to memory of hypervisor 109A, and the rest of the packet handling continues in the hypervisor, such as sending it out of the pNIC 118A. Thus, the packet processing places significant demands on the CPU resources. The virtual interrupts caused by invoking the guest driver also place demands on the CPU resources. Additional demands are placed by the guest VNIC driver to allocate a packet buffer and associate a data structure to represent the packet. All these add up to placing significant demands on CPU resources.

If the network function packet processing is offloaded from VM1 107A, then data packets do not need to be provided to and from VM1 107A via VNIC 190A, and therefore, some of the costly CPU cycles may be spared.

4. Example Applications of Network Function Offloading

In an embodiment, providing packet processing offloads from VMs onto a PNIC or a hypervisor facilitates moving running VMs from one hypervisor server system to another hypervisor server system.

Because the offloaded processing can be implemented either in software on a hypervisor, or in hardware of a PNIC, it is possible to move a VM to servers having hardware specifications somewhat different then the offload capabilities. Thus, the capabilities of the offload that are not available in the hardware may have to be implemented in software.

Software implementations of the offload can collaborate with hardware implementations of the offload in many ways. For example, it is possible to leverage a partial hardware acceleration to assist in the software implementation of the network function packet processing. For example, a hardware implementation of the offload executed in a PNIC may be utilized to compute hash values over some fields of a packet header, while a software implementation may be utilized to process the computed hashes or to use the hashes as keys to look up a hash table.

In an embodiment, offloading network function packet processing pertains to offloading the fast path packet processing. If the fast path processing is fully offloaded, then only the packets that require the slow path processing are directed to VMs. Since in a typical virtualization environment, most of the data packets follow a fast path, the offloading of the fast path packet processing may result in significant savings of CPU resources and significant increases in packet processing rates.

If the network function packet processing is at least partially offloaded, then the offloading may still provide a performance boost, especially if the offload is downloaded onto specialized hardware of a PNIC. In many cases, the specialized hardware can perform the offloaded processing steps more efficiently than the software executed in the VM.

5. Example Interfaces

In an embodiment, a network function packet processing offload provides a collection of primitives and instructions that capture the entire, or at least some, network function processing of data flow packets. The primitives may capture software components that collectively form the desired packet processing functionalities. The instructions may represent the network function processing functionalities to be performed on the network packets.

Preparing an offload for the network function packet processing module for a PNIC or/and a hypervisor includes porting the network functions that otherwise would have been performed by a VM to the network functions that the PNIC or/and the hypervisor can understand and perform. This may include translating the primitives and instructions specified in the VM's network function processing module to the primitives and instructions that a packet processing module of the hypervisor or/and the PNIC can understand.

Figure 5:
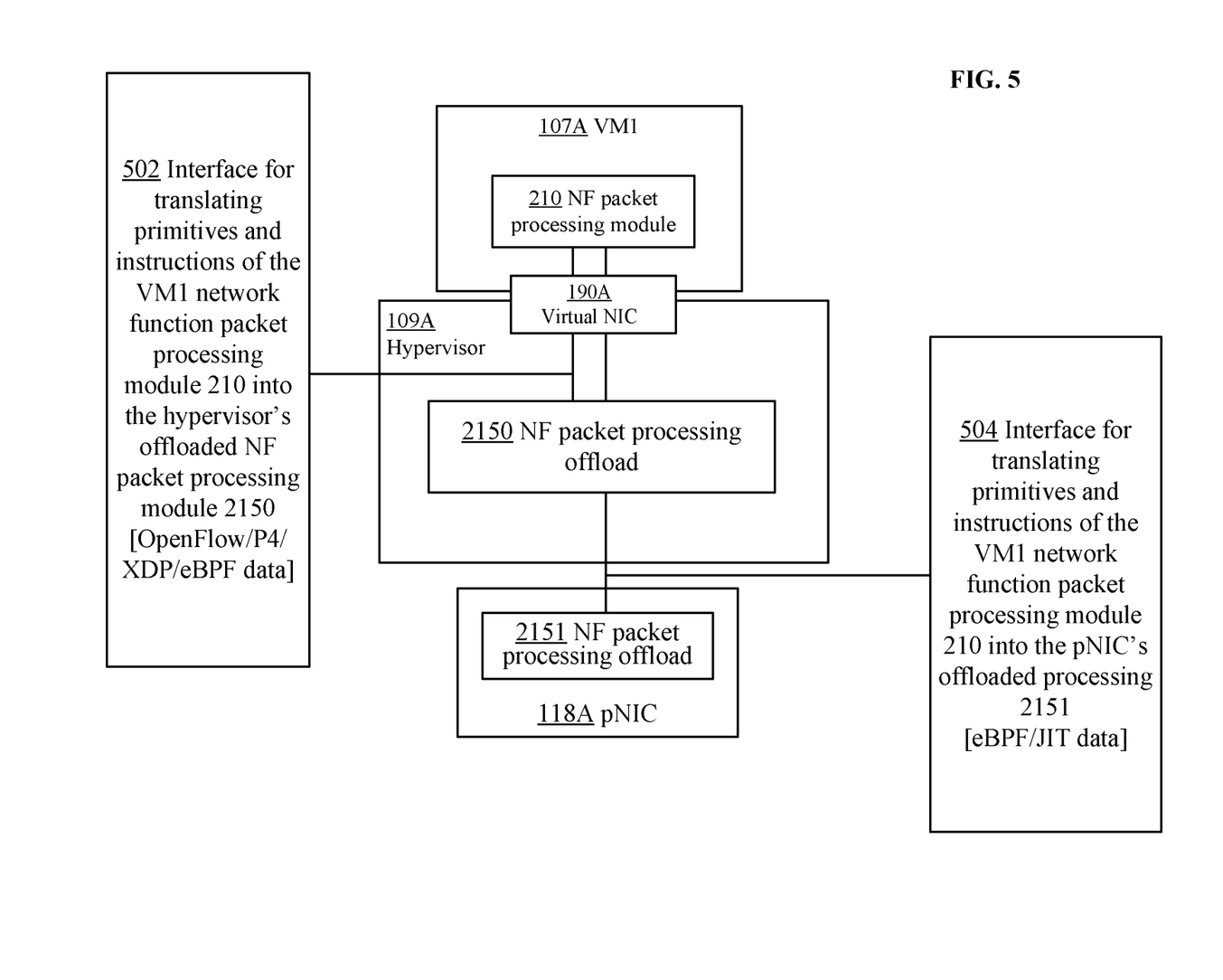
FIG. 5 is an example diagram depicting example interfaces for offloading virtual machine packet processing via a virtual device.

FIG. 5 is an example diagram depicting example interfaces for offloading virtual machine packet processing. In FIG. 5, an interface 502 is configured to translate primitives and instructions of network function packet processing module 210 into a network function packet processor offload 2150. Offload 2150 may be executed by hypervisor 109A.

FIG. 5 also depicts an interface 504 for translating primitives and instructions of network function packet processing module 210 into a network function packet processor offload 2151. Offload 2151 may be executed by PNIC 118A.

Performing the translation depends on the implementation of a hypervisor and/or a PNIC, and may be performed by implementing for example, a match-plus-action-type interface. Such an interface may be built using the OpenFlow protocol. OpenFlow is an open and standard interface for specifying network packet processing in a programmable fashion. OpenFlow provides an instruction set for network packet processing. The instructions/primitives can be broadly categorized as either instructions for matching against header fields of a packet, or instructions that perform an action on a packet when a match is found. Usage of an OpenFlow-based-interface for packet processing involves specifying flows, each of which includes a match part and one or more actions. At any one time, many flows are programmed into the processing engine. When a packet is being processed, relevant fields from its header are used to find a match among the programmed flows. Upon a match, the specified actions are taken. In some designs, multiple matches are possible, in which case there may be relative priority among different flows that specify which one takes precedence.

Another approach allows adopting a more programmable interface by using the Protocol Independent Packet Processors ("P4") language. P4 is a high-level language for programming protocol independent packet processors. It can be viewed as a domain specific language that works in a similar fashion as OpenFlow but provides greater flexible programmatic specification for things like how to parse packet headers and what actions to take.

Yet another approach is to provide an even more general programming interface for specifying packet processing offload. An example of a general programming interface is the extended Berkeley Packet Filter ("eBPF") protocol. A desired offload's functionality may be specified as an eBPF program which can be thought of as a low-level programming language that is, to some extent, similar to machine code. Just like Linux's implementation of eBPF allows downloading of an eBPF program to be safely executed inside Linux kernel, the offload program may be offloaded via an eBPF type from an untrusted VM to the hypervisor or PNIC. The interfaces for generating network function packet processing offloads may be also built using other approaches and protocols.

6. Example Process of Offloading Network Function Processing

Figure 6:
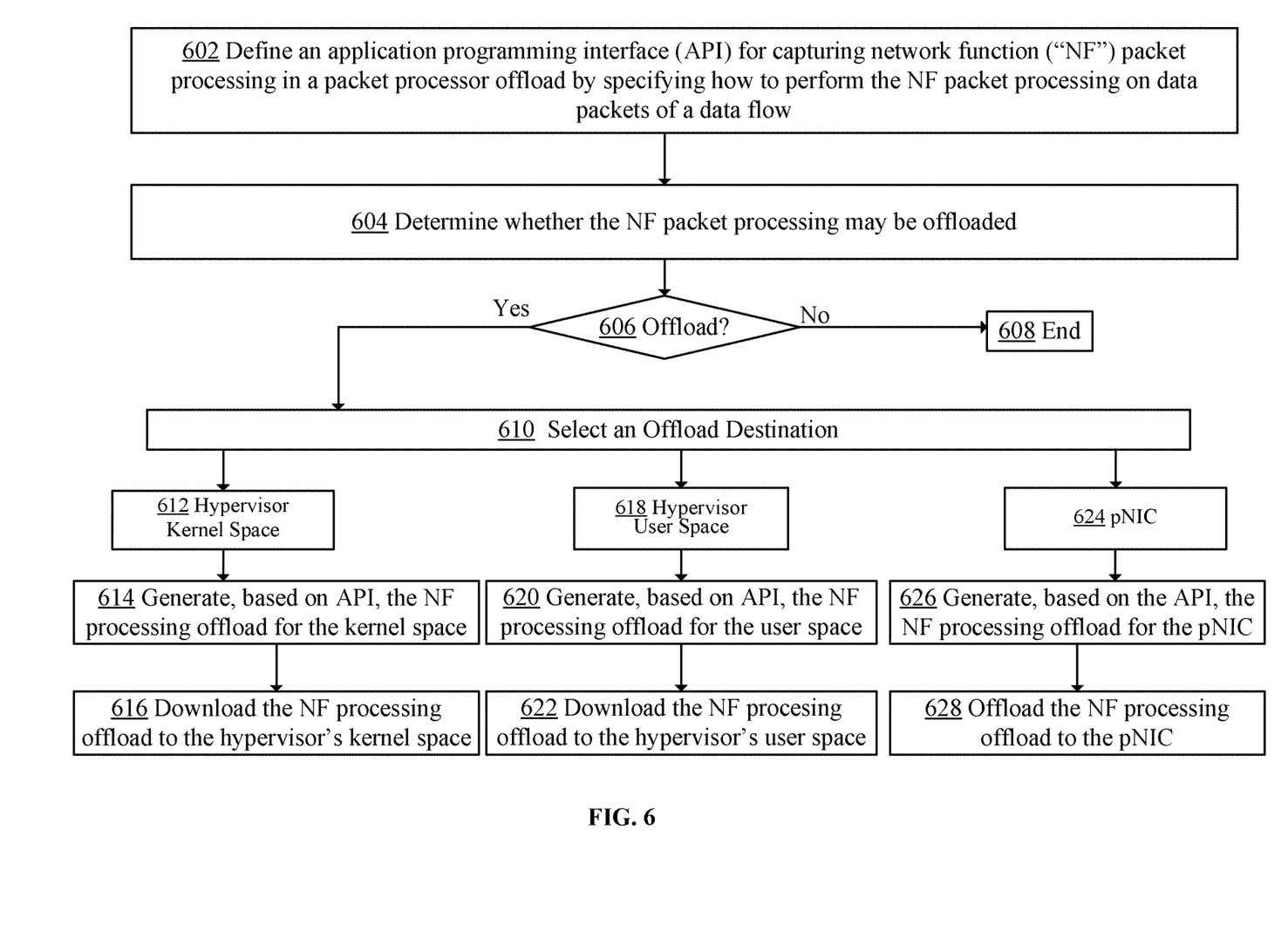
FIG. 6 is an example flow chart for offloading virtual machine packet processing via a virtual device.

FIG. 6 is an example flow chart for offloading virtual machine packet processing via a virtual device.

In step 602, a hypervisor implemented in a host computer in a virtualized environment defines an application programming interface ("API") for capturing network function packet processing in a packet processing offload by specifying how to perform the network function packet processing on data packets of a data flow. If the hypervisor is configured to process a plurality of data flows, then the hypervisor may define one API for each of the data flows. Hence, the process described in steps 602-628 may be repeated for each of the data flows of the plurality of data flows.

An API may be defined using the OpenFlow approach, the P4 capabilities, the eBPF approach, or the like. Examples of the interfaces are described in FIG. 5.

In step 604, the hypervisor determines whether the network function packet processing can be offloaded. This may be determined in advance, and based on business considerations, such as whether PNIC suppliers are available, and/or design preferences. Furthermore, this may be determined based on hardware capabilities of a PNIC implemented on the host on which the hypervisor is executed, and based on capabilities of the hypervisor itself. Examples of factors and considerations are described in prior sections.

If, in step 606, the hypervisor determines that the network function packet processing can be offloaded, then, in step 610, the hypervisor determines an offload destination. Otherwise, the hypervisor stops the offloading process in step 608.

In an embodiment, an offload destination is a hypervisor kernel space (612), a hypervisor user space (618), and/or a PNIC (624). The offload destination may be selected based on the factors and considerations described above.

In step 614, the hypervisor generates, based on the contents of the API, the packet processor offload for the kernel space of the hypervisor. This may include translating, according to the API, the primitives and instructions of the network function packet processing to the primitives and instructions that may be executed in the kernel space of the hypervisor to enable the hypervisor to apply the network function packet processing to data packets of the data flow.

In step 616, the hypervisor downloads the packet processor offload to the kernel space of the hypervisor to enable the hypervisor to provide the network function packet processing on data packet of the data flow detected by the hypervisor.

In step 620, the hypervisor generates, based on the contents of the API, the packet processor offload for the user space of the hypervisor. This may include translating, according to the API, the primitives and instructions of the network function packet processing to the primitives and instructions that may be executed in the user space of the hypervisor to enable the hypervisor to apply the network function packet processing to data packets of the data flow.

In step 622, the hypervisor downloads the packet processor offload to the user space of the hypervisor to enable the hypervisor to provide the network function packet processing on data packet of the data flow detected by the hypervisor.

In step 626, the hypervisor generates, based on the contents of the API, the packet processor offload for the PNIC. This may include translating, according to the API, the primitives and instructions of the network function packet processing to the primitives and instructions that may be executed by the PNIC to enable the PNIC to apply the network function packet processing to data packets of the data flow.

In step 628, the hypervisor downloads the packet processor offload onto the PNIC to enable the PNIC to provide the network function packet processing on data packet of the data flow detected by the PNIC.

The hypervisor may repeat the step 602-628 for each of the data flow of the plurality of data flows, and each time the hypervisor configures a new data flow and/or receives new instructions for performing network function packet processing for the new data flow.

7. Example Processing Using Offloaded Network Functions

Figure 7:
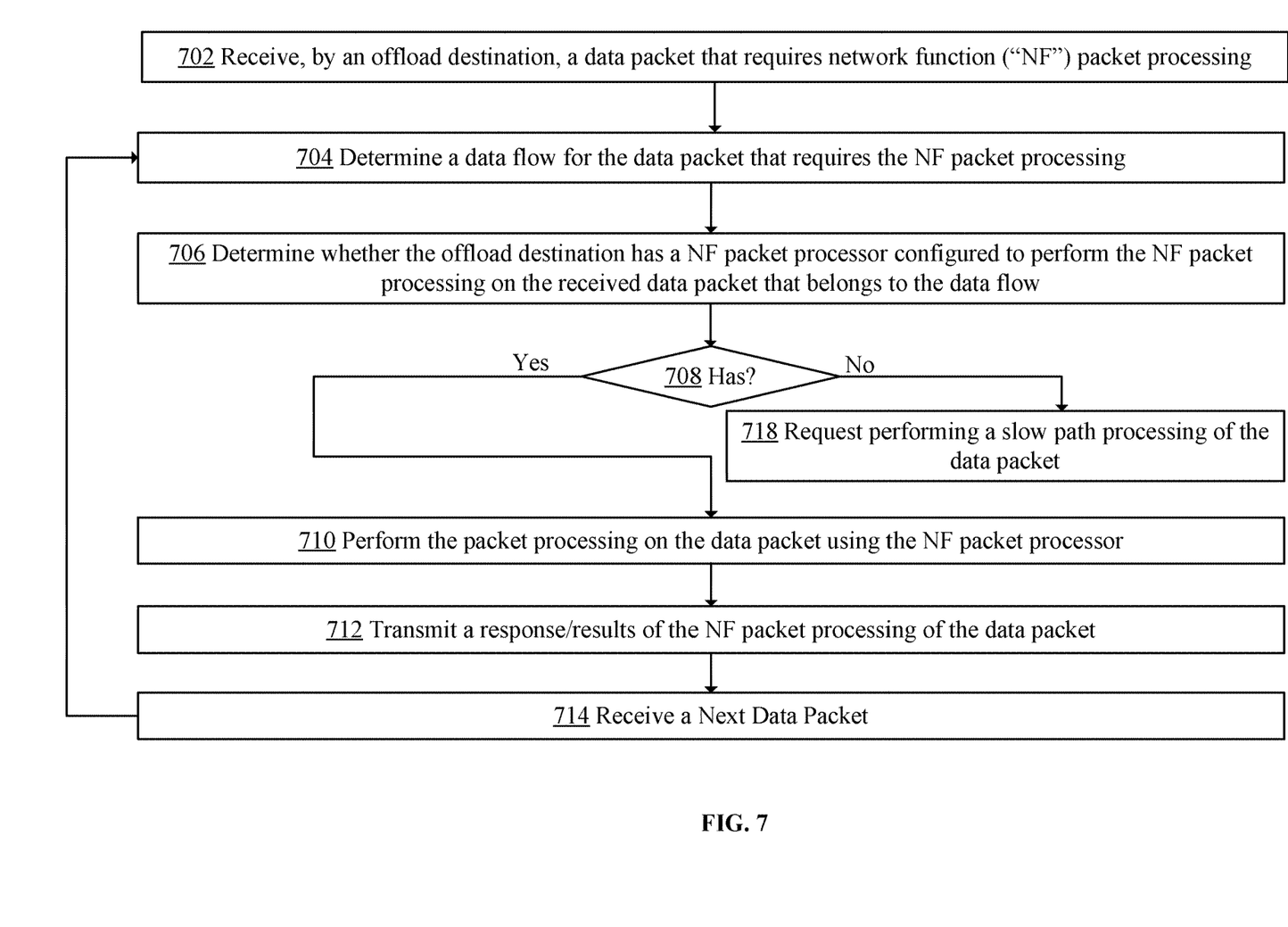
FIG. 7 is an example flow chart for processing data packets using a network function packet processor offloaded from a virtual machine onto a virtual device.

FIG. 7 is an example flow chart for processing data packets using a network function packet processor offloaded from a virtual machine via a virtual device. The steps described in FIG. 7 may be performed by executing an offload downloaded to an offload destination, such as a PNIC, a hypervisor's kernel space, and/or a hypervisor's user space.

In step 702, an offload destination detects/receives a data packet that requires some type of network function packet processing.

In step 704, the offload destination determines a data flow for the data packet that requires the network function packet processing. This may include extracting contents from certain data fields of a header of the data packet, and determining a data flow identifier based on the extracted contents.

In step 706, the offload destination determines whether the offload destination has a network function packet processor that is configured to perform the network function packet processing on the data flow. This may include comparing the data flow identifier determined for the received data packet with the data flows identifiers of the data flows for which packet processing offloads have been downloaded onto the offload destination.

If, in step 708, the offload destination determines that the offload destination has the network function packet processor that is configured to perform the processing on the received data packet, then the offload destination proceeds to performing step 710; otherwise, the offload destination proceeds to performing step 718.

In step 710, the offload destination performs the network function packet processing on the received data packet using the network function packet processor ("offload") that is configured to perform the processing on the packet flow. That may include packet forwarding, encapsulating and decapsulating for overlay networks, IP routing, NAT processing, and the like.

In step 712, the offload destination determines a result of the packet processing for the data packet, and transmits the result toward the packet's destination. The result may be transmitted for example, to a destination node or to a compute node if the packet requires additional processing. Once the result is transmitted or otherwise communicated, the network function packet processing of the data packet is completed. It is also possible that the decision coming out of processing the packet is to drop the packet.

In step 714, the offload destination detects/receives a next data packet, and proceeds to performing the steps 702-714 for the next data packet.

The process may be repeated each time an offload destination detects/receives a data packet that requires network function packet processing. Upon receiving such a data packet, the offload destination proceeds to executing steps 704-714.

However, if in step 708, the offload destination determines that it does not have a network function packet processor configured to perform the packet processing on the received data packet, then the offload destination proceeds to performing step 718.

In step 718, the offload destination may request that a hypervisor perform a slow path processing of the data packet. Upon receiving the request, the hypervisor may proceed to executing steps 601-628 described in FIG. 6, and either generate and offload a packet processing offload, or perform the network function packet processing on the data packet by itself. That may depend on whether the requested network function packet processing can be offloaded.

8. Improvements Provided by Certain Embodiments

In an embodiment, an approach provides mechanisms for offloading virtual machine packet processing via a virtual device to implementations of the virtual device, such as at a PNIC, a hypervisor, or both. The approach improves the packet processing performance in terms of saving CPU resources and increases packet processing rates. In some cases, offloading the processing may result in savings of about 60% of the CPU cost. There might be some additional savings of the CPU cycles spent inside the VM because there may be no need for a guest driver of a VNIC to allocate packet buffers for receiving packets and managing the subsequent transmissions through the VNIC.

In an embodiment, an approach improves the network function packet processing by having fast path network function processing offloaded from a VM, and having the fast path processing performed by a hypervisor or a PNIC, not by the VM.

In an embodiment, an approach includes capturing, in an offload, network function primitives and instruction for performing network function packet processing on data, and transmitting the offload to a virtual device such as a packet processing module of the hypervisor and/or the PNIC. Usually, offloading the network function packet processing onto hardware components of the PNIC provides the most benefits as performing the packet processing in hardware may be the most efficient.

Offloading the network function packet processing from a VM onto a PNIC or a hypervisor may improve efficiency of performing the network functions on data packets. If the entire packet processing is offloaded, then the packets can be processed entirely outside the VM and at a relatively high rate. But even if only some of the packet processing is offloaded from the VM, the offloading still provides some time savings.

Offloading the network function packet processing from a VM onto a hypervisor or a PNIC may advance the development of virtualization environments and boost integration of the SDN with components developed by other providers.

9. Implementation Mechanisms

The present approach may be implemented using a computing system comprising one or more processors and memory. The one or more processors and memory may be provided by one or more hardware machines. A hardware machine includes a communications bus or other communication mechanisms for addressing main memory and for transferring data between and among the various components of hardware machine. The hardware machine also includes one or more processors coupled with the bus for processing information. The processor may be a microprocessor, a system on a chip (SoC), or other type of hardware processor.

Main memory may be a random-access memory (RAM) or other dynamic storage device. It may be coupled to a communications bus, and used for storing information and software instructions to be executed by a processor. Main memory may also be used for storing temporary variables or other intermediate information during execution of software instructions to be executed by one or more processors.

10. General Considerations

Although some of various drawings may illustrate a number of logical stages in a particular order, stages that are not order dependent may be reordered and other stages may be combined or broken out. While some reordering or other groupings may be specifically mentioned, others will be obvious to those of ordinary skill in the art, so the ordering and groupings presented herein are not an exhaustive list of alternatives. Moreover, it should be recognized that the stages could be implemented in hardware, firmware, software or any combination thereof.

The foregoing description, for purpose of explanation, has been described regarding specific embodiments. However, the illustrative embodiments above are not intended to be exhaustive or to limit the scope of the claims to the precise forms disclosed. Many modifications and variations are possible in view of the above teachings. The embodiments were chosen to best explain the principles underlying the claims and their practical applications, to thereby enable others skilled in the art to best use the embodiments with various modifications as are suited to the uses contemplated.

Any definitions set forth herein for terms contained in the claims may govern the meaning of such terms as used in the claims. No limitation, element, property, feature, advantage or attribute that is not expressly recited in a claim should limit the scope of the claim in any way. The specification and drawings are to be regarded in an illustrative rather than a restrictive sense.

As used herein the terms "include" and "comprise" (and variations of those terms, such as "including," "includes," "comprising," "comprises," "comprised" and the like) are intended to be inclusive and are not intended to exclude further features, components, integers or steps.

References in this document to "an embodiment," indicate that the embodiment described or illustrated may include a particular feature, structure, or characteristic, but every embodiment may not necessarily include the particular feature, structure, or characteristic. Such phrases are not necessarily referring to the same embodiment. Further, when a particular feature, structure, or characteristic is described or illustrated in connection with an embodiment, it is believed to be within the knowledge of one skilled in the art to affect such feature, structure, or characteristic in connection with other embodiments whether or not explicitly indicated.

Various features of the disclosure have been described using process steps. The functionality/processing of a given process step could potentially be performed in different ways and by different systems or system modules. Furthermore, a given process step could be divided into multiple steps and/or multiple steps could be combined into a single step. Furthermore, the order of the steps can be changed without departing from the scope of the present disclosure.

It will be understood that the embodiments disclosed and defined in this specification extend to alternative combinations of the individual features and components mentioned or evident from the text or drawings. These different combinations constitute various alternative aspects of the embodiments.

What is claimed is:

1. A method comprising:
receiving, by a virtual machine (VM), one or more packets of a data flow; performing, by the VM, slow path packet processing of the one or more packets of the data flow;
generating, by the VM, a set of instructions for performing network function processing offload on data packets that belong to the data flow that would otherwise be performed by the VM, the network function processing comprising a network processing function that operates on any network layer between the lower layers of networking and the Layer 4 of networking;
providing the set of instructions for the data flow to a hypervisor;
in response to receiving the set of instructions for the data flow:
obtaining available resources for each of a plurality of destinations, the plurality of destinations comprising the following resources: a physical network interface controller ("PNIC"), a hypervisor kernel space module and a hypervisor user space module;
determining, based on hardware capabilities of the PNIC and capabilities of the hypervisor, whether to offload the network function processing of the data flow to the hypervisor;
in response to determining that the network function processing for the data flow can be offloaded to the hypervisor:
determining to offload the network function processing of the data flow to a kernel space module of a hypervisor; and
based on the determining, downloading the set of instructions to the kernel space module of the hypervisor to configure the hypervisor to enable the hypervisor to provide the network function processing on the data packets that belong to the data flow.

2. The method of claim 1, wherein the packet processing offload destination is the PNIC.

3. The method of claim 1, wherein the packet processing offload destination is the hypervisor user space module.

4. The method of claim 1, further comprising:
determining, based on the hardware capabilities of the PNIC and the capabilities of the hypervisor, whether the network function processing for the data flow can be offloaded to a user space module of the hypervisor;
in response to determining that network function packet processing for the data flow can be offloaded to the user space module of the hypervisor:
downloading the set of instructions to the user space module of the hypervisor to configure the hypervisor to enable the hypervisor to provide the network function processing on the data packets that belong to the data flow.

5. The method of claim 1,
wherein a packet processor offload configuration for the packet processing offload destination is generated based at least in part on the downloaded set of instructions and an application programing interface ("API") for capturing network function packet processing; and
wherein generating, based on the set of instructions and the API, the packet processor offload for the PNIC comprises translating actions included in the set of instructions into instructions and primitives that the PNIC can process;
wherein generating, based at least on the set of instructions and the API, the packet processor offload configuration for the kernel space module of the hypervisor comprises translating the actions included in the set of instructions into instructions and primitives that the hypervisor can process; and
wherein generating, based at least on the set of instructions and the API, the packet processor offload configuration for the user space module of the hypervisor comprises translating the actions included in the set of instructions into instructions and primitives that the hypervisor can process.

6. One or more non-transitory computer-readable storage media storing one or more computer instructions which, when executed by one or more processors, cause the one or more processors to perform:
receiving one or more packets of a data flow;
enabling a virtual machine to perform slow path packet processing of the one or more packets of the data flow;
generating a set of instructions for performing network function processing offload on data packets that belong to the data flow, the network function processing comprising a network processing function that operates on any network layer between the lower layers of networking and the Layer 4 of networking;
obtaining available resources for each of a plurality of destinations, the plurality of destinations comprising the following resources: a physical network interface controller ("PNIC"), a hypervisor kernel space module and a hypervisor user space module;
determining, based on hardware capabilities of the PNIC and capabilities of a hypervisor, whether to offload the network function processing of the data flow to the hypervisor;
in response to determining that the network function processing for the data flow can be offloaded to the hypervisor:
determining whether the network function processing for the data flow can be offloaded to a kernel space module of the hypervisor;
in response to determining that the network function processing for the data flow can be offloaded to the kernel space module of the hypervisor:
downloading the set of instructions to the kernel space module of the hypervisor to configure the hypervisor to enable the hypervisor to provide the network function processing on the data packets that belong to the data flow.

7. The one or more non-transitory computer-readable storage media of claim 6, wherein the packet processing offload destination is the PNIC.

8. The one or more non-transitory computer-readable storage media of claim 6, wherein the packet processing offload destination is the hypervisor user space module.

9. The one or more non-transitory computer-readable storage media of claim 8, wherein a packet processor offload configuration for the packet processing offload destination is generated based at least in part on the downloaded set of instructions and an application programing interface ("API") for capturing network function packet processing.

10. The one or more non-transitory computer-readable storage media of claim 8, comprising additional instructions which, when executed by the one or more processors, cause the one or more processors to perform:

determining, based on the hardware capabilities of the PNIC and the capabilities of the hypervisor, whether the network function processing for the data flow can be offloaded to a user space module of the hypervisor;

in response to determining that the network function processing for the data flow can be offloaded to the user space module of the hypervisor:

downloading the set of instructions to the user space module of the hypervisor to configure the hypervisor to enable the hypervisor to provide the network function processing on the data packets that belong to the data flow.

11. The one or more non-transitory computer-readable storage media of claim 9, wherein generating, based at least on the set of instructions and the API, the packet processor offload for the PNIC comprises translating actions included in the set of instructions into instructions and primitives that the PNIC can process;

wherein generating, based at least on the set of instructions and the API, the packet processor offload configuration for the kernel space module of the hypervisor comprises translating the actions included in the set of instructions into instructions and primitives that the hypervisor can process; and wherein generating, based at least on the set of instructions and the API, the packet processor offload configuration for the user space module of the hypervisor comprises translating the actions included in the set of instructions into instructions and primitives that the hypervisor can process.

12. A host computer comprising: a virtual machine (VM) configured to:

receive one or more packets of a data flow;

perform slow path packet processing of the one or more packets of the data flow; and generate a set of instructions for performing network function processing offload on data packets that belong to the data flow, the network function processing includes a network processing function that operates on any network layer between the lower layers of networking and the Layer 4 of networking;

one or more processors;

one or more memory units; and a hypervisor configured with one or more non-transitory computer-readable storage media storing one or more computer instructions which, when executed by the one or more processors, cause the one or more processors to perform:

receiving the set of instructions for performing the network function processing offload on data packets that belong to the data flow;

in response to receiving the set of instructions for the data flow:

obtaining available resources for each of a plurality of destinations, the plurality of destinations comprising the following resources: a physical network interface controller ("PNIC"), a hypervisor kernel space module and a hypervisor user space module;

determining, based on hardware capabilities of the PNIC and capabilities of the hypervisor, whether to offload the network function processing of the data flow to the hypervisor;

in response to determining that the network function processing for the data flow can be offloaded to the hypervisor:

determining whether the network function processing for the data flow can be offloaded to a kernel space module of the hypervisor;

in response to determining that the network function processing for the data flow can be offloaded to the kernel space module of the hypervisor:

downloading the set of instructions to the kernel space module of the hypervisor to configure the hypervisor to enable the hypervisor to provide the network function processing on the data packets that belong to the data flow.

13. The host computer of claim 12, wherein the packet processing offload destination is the PNIC.

14. The host computer of claim 12, wherein the packet processing offload destination is the hypervisor user space module.

15. The host computer of claim 12, wherein the hypervisor is further configured to perform:

determining, based on the hardware capabilities of the PNIC and the capabilities of the hypervisor, whether the network function processing for the data flow can be offloaded to a user space module of the hypervisor;

in response to determining that the network function processing for the data flow can be offloaded to the user space module of the hypervisor:

downloading the set of instructions to the user space module of the hypervisor to configure the hypervisor to enable the hypervisor to provide the network function processing on the data packets that belong to the data flow.

16. The method of claim 12, wherein a packet processor offload configuration for the packet processing offload destination is generated based at least in part on the downloaded set of instructions and an application programing interface ("API") for capturing network function packet processing; and wherein generating, based at least on the set of instructions and the API, the packet processor offload for the PNIC comprises translating actions included in the set of instructions into instructions and primitives that the PNIC can process;

wherein generating, based at least on the set of instructions and the API, the packet processor offload configuration for the kernel space module of the hypervisor comprises translating the actions included in the set of instructions into instructions and primitives that the hypervisor can process; and wherein generating, based at least on the set of instructions and the API, the packet processor offload configuration for the user space module of the hypervisor comprises translating the actions included in the set of instructions into instructions and primitives that the hypervisor can process.

* * * * *